July 2, 1957     J. G. CHUBBUCK     2,797,666
PULSE PROPORTIONING DUAL INTEGRATING SERVOMECHANISM
Filed June 29, 1955     5 Sheets-Sheet 1

INVENTOR
JOHN G. CHUBBUCK
BY
ATTORNEYS

July 2, 1957      J. G. CHUBBUCK      2,797,666
PULSE PROPORTIONING DUAL INTEGRATING SERVOMECHANISM
Filed June 29, 1955      5 Sheets-Sheet 2

INVENTOR
JOHN G. CHUBBUCK

BY

ATTORNEYS

July 2, 1957 — J. G. CHUBBUCK — 2,797,666
PULSE PROPORTIONING DUAL INTEGRATING SERVOMECHANISM
Filed June 29, 1955 — 5 Sheets-Sheet 3

WING ERROR
($e_\theta$)
Relative Scale:
1 deg/in

TORQUE MOTOR POSITION
(Wing Acceleration)
Relative Scale:
$1.3 \times 10^4$ deg/sec²/in SPOOL POSITION
(Wing Rate)
Relative Scale:
318 deg/sec/in WING POSITION
Relative Scale:
10 deg/in

INVENTOR
JOHN G. CHUBBUCK
BY
ATTORNEYS

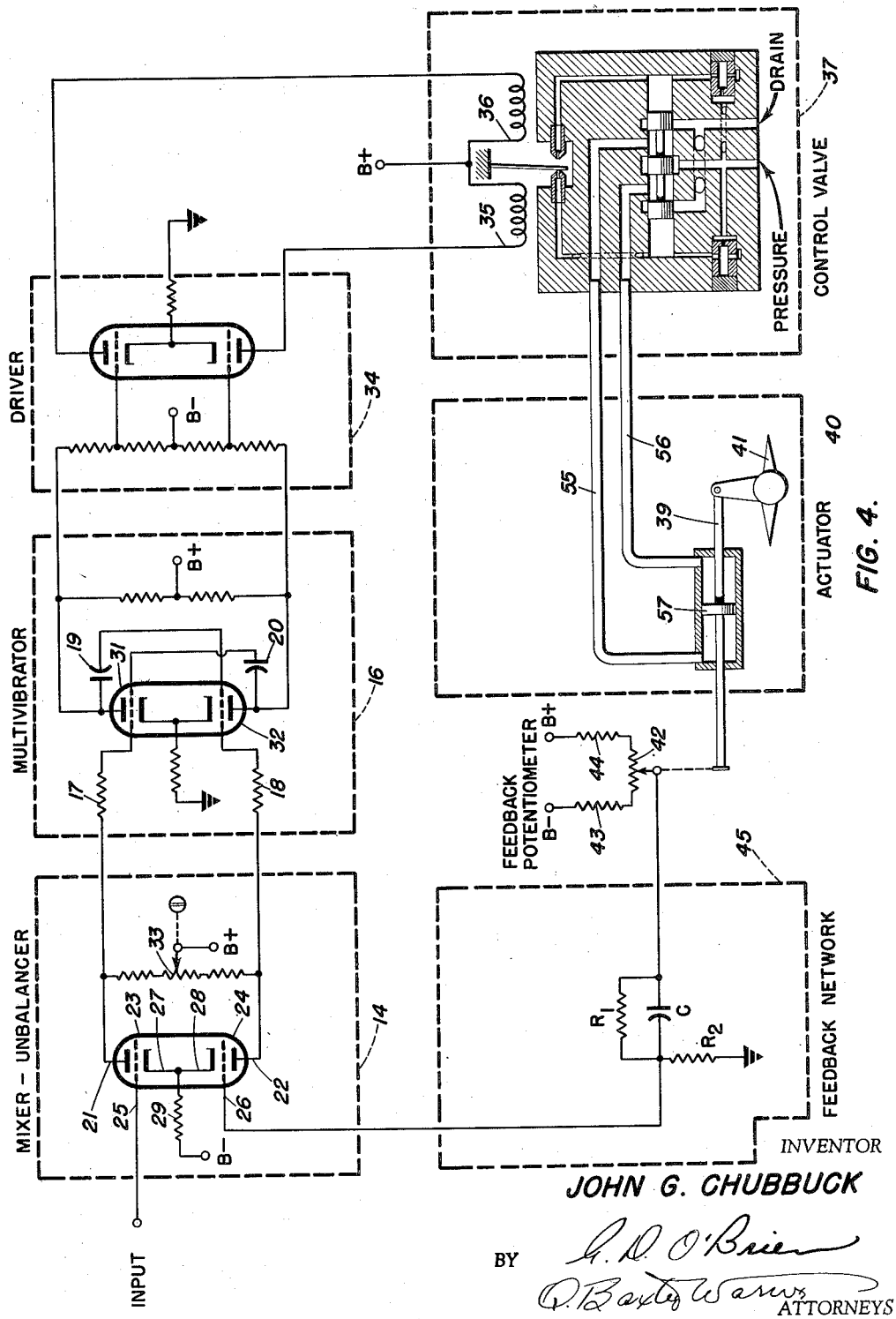

July 2, 1957  J. G. CHUBBUCK  2,797,666
PULSE PROPORTIONING DUAL INTEGRATING SERVOMECHANISM
Filed June 29, 1955  5 Sheets-Sheet 5
FIG. 5.
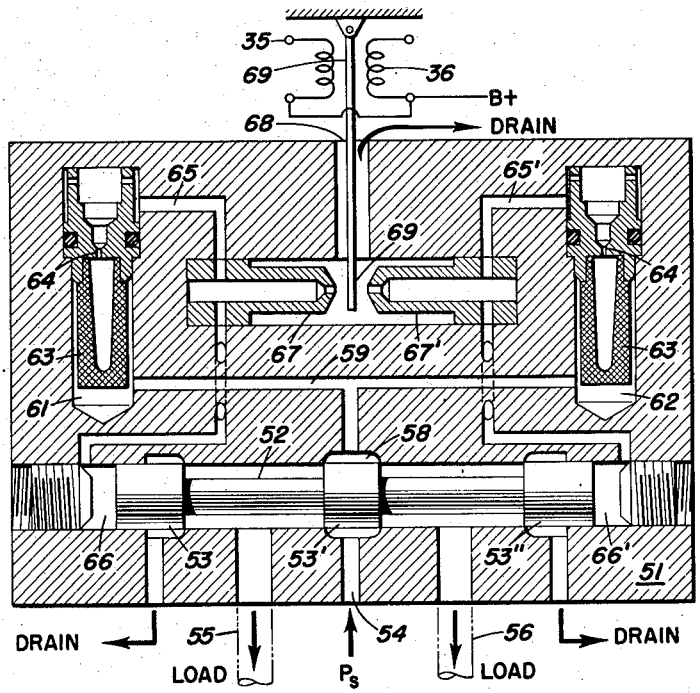
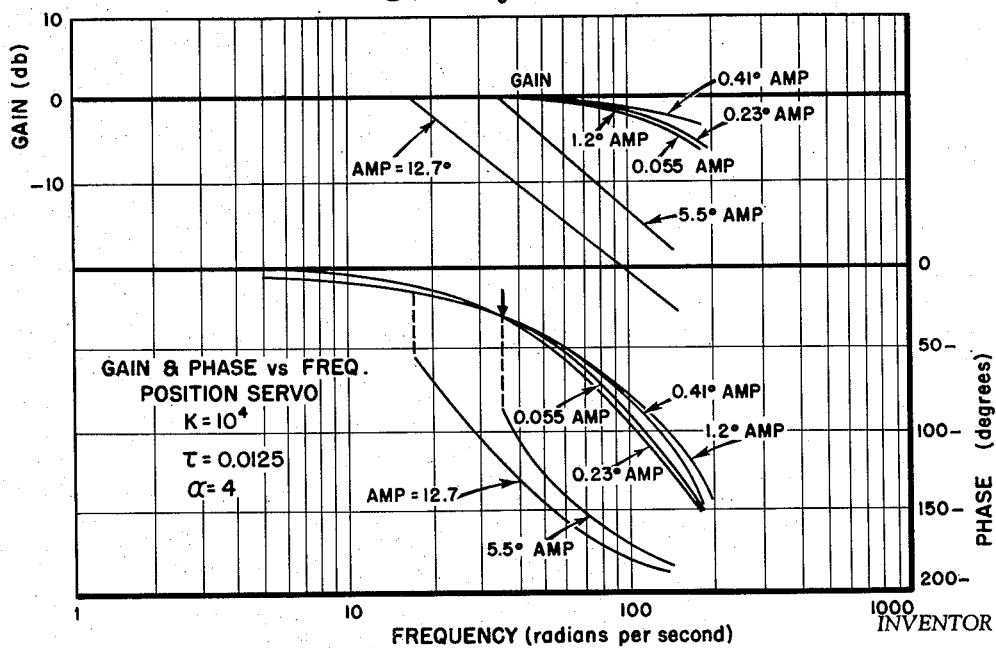
FIG. 6.
INVENTOR
JOHN G. CHUBBUCK
BY
ATTORNEYS

United States Patent Office 2,797,666
Patented July 2, 1957

2,797,666

PULSE PROPORTIONING DUAL INTEGRATING SERVOMECHANISM

John G. Chubbuck, Silver Spring, Md., assignor to the United States of America as represented by the Secretary of the Navy Application June 29, 1955, Serial No. 519,012

7 Claims. (Cl. 121—41)

The present invention relates to hydraulic servomechanisms. More particularly, it relates to a novel hydraulic control valve and valve drive means for controlling the position of a pressure fluid actuator.

Linear hydraulic servomechanisms are designed to achieve the proportional control of an output member in response to an input stimulus. When such mechanisms are truly linear, any desired control signal can be applied thereto and an output response will be obtained which is entirely predictable. In the usual control applications, linearity of response is a highly desired property, since the stability of the mechanism and accuracy of response can then be expected to conform with design specifications throughout its operating range.

In practice, however, a linear servomechanism, particularly the control valve thereof, can only be constructed with the utmost attention to details. Finally, painstaking trimming and adjustment operations are necessary to eliminate undesired non-linearities.

The shortcomings of present linear servomechanisms are largely attributable to their control valves wherein dimensional tolerances as low as .0001 inch are frequently found. As might be expected in such precisely fitted components, friction of the moving parts and dirt in the hydraulic fluid can cause large departures from the linear response desired and expected. It therefore happens that the ordinary "linear" mechanism is in reality highly non-linear for low amplitude input signals or in the event of fouling by dirt, even for input signals of moderate amplitude. Furthermore, large transients applied to a less than critically damped linear servo result in large overshoots and subsequent decaying oscillations. Overshoot and oscillation are in complete accord with the theoretical behavior of a linear mechanism. Therefore, even in linear mechanisms, intentional non-linearities are introduced for the purpose of controlling overshoot. Conventionally, however, limits are applied to the input signal rather than to any of the hydraulic elements of the valve, with the result that the capability of the mechanism for rapid response is not fully utilized.

Accordingly, one of the objects of the present invention is to produce a hydraulic servomechanism which will respond to large amplitude transient or periodic signals with no detectable trace of overshoot in the response thereto.

Another object of the present invention is to provide a hydraulic servomechanism capable of responding to very small input signals such as would excite no response whatsoever in a linear servomechanism.

A further object of the present invention is to provide a servomechanism capable of providing a response waveform practically identical with the input waveform, particularly for low input amplitudes, the departure from exact similarity therebetween being negligible.

An additional object is to provide a valve control means capable of a high degree of resolution thereby permitting a relaxation of the resolution requirements of the control valve itself without sacrifice in the performance of the servomechanism.

Still another important object is to provide a servomechanism employing a simple control valve which may be produced in quantity without undue burden in maintaining dimensional tolerances, and so forth.

Other objects and many of the attendant advantages of this invention will be appreciated readily as the same becomes understood by reference to the following detailed description, when considered in connection with the accompanying drawings.

Briefly, the present invention comprises a multivibrator valve driver providing a square waveform output. The symmetry of the output thereof varies as a function of the error signal. The control valve includes a flapper which functions as a switch for controlling the direction of pressure fluid flow into an integrating chamber of the valve. The accumulation of fluid within the integrating chamber controls the position of a valve spool. The spool position, by varying the area of an orifice, controls the rate at which the power actuator alters its position. The invention will therefore be recognized as an Acceleration Switching Servomechanism in which two successive integrating operations are performed.

In the drawings:

Fig. 4 is a schematic diagram of the acceleration switching servo;

Fig. 5 is a section, on an enlarged scale, of the control valve used in the servo of the present invention; and Fig. 6 is a chart of the response of the pulse proportioning dual integrating servomechanism to input sinusoidal signal of various amplitudes.

Figure 1A:
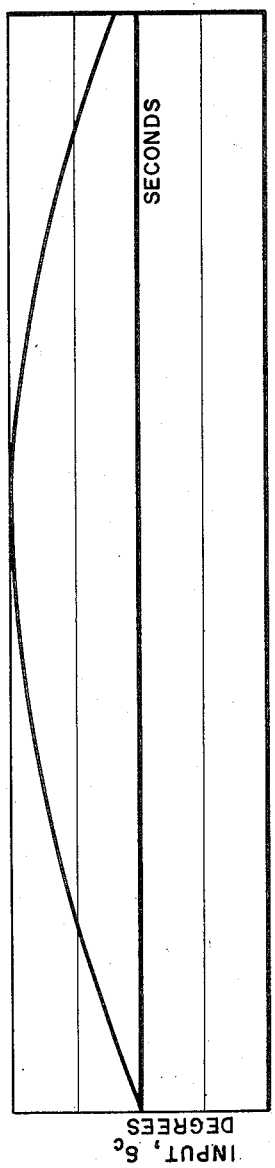
Fig. 1A is a chart of a typical input function for the servo illustrated in Fig. 1.
Figure 1B:
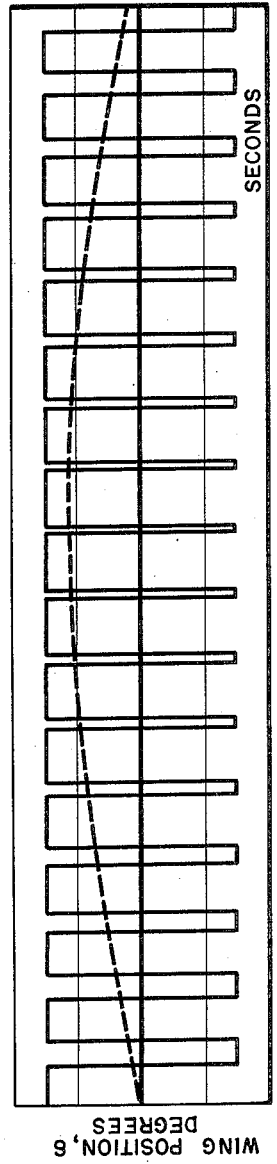
Fig. 1B is a chart of the output of the servo illustrated in Fig. 1 resulting from the input function of Fig. 1A.
Figure 1:
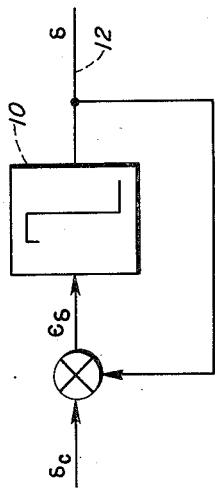
Fig. 1 is a block diagram of a prior art position switching servo.

In Fig. 1, there appears a block diagram of a well-known type of position switching servo, which is sometimes referred to as a "bang-bang" servo. In a servo of this type, the output member is either at rest in one of its extreme positions or at rest in its other extreme position. A switch 10, symbolically represented, but which in practice might comprise a commutator controlled torque motor or a vibrating reed, causes the output member 12 to oscillate between extremes, dwelling in one position longer than the other according to whether there is a positive or negative difference $e\delta$ between the input $\delta_c$ and output position $\delta$. In Fig. 1A a time varying input function is shown which might be the aircraft rudder position necessary to complete a turn. In Fig. 1B, the actual output member position appears. It will be observed that the output waveform does not conform to the input waveform. However, when the output is applied to a load possessing some reactive quality, as does the air in the case of an aircraft, a filtering action results which smoothes the response of the aircraft to the output member position to the average value thereof. The average value is indicated in Fig. 1B by the dotted line which will be seen to possess a form similar to the input function.

The amount of smoothing obtainable depends upon the nature of the load. For loads reasonably responsive to motion of the output member, relatively little smoothing is provided. Therefore, considering the violent excursions of the output member from one extreme position to the opposite, and the excessive power consumed, a "bang-bang" servo is obviously unsuited for all except the crudest applications.

Figure 2:
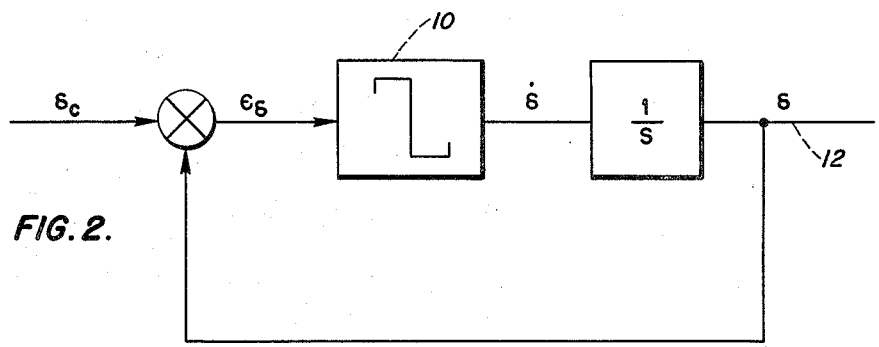
Fig. 2 is a block diagram of a known rate switching type servo.
Figure 2A:
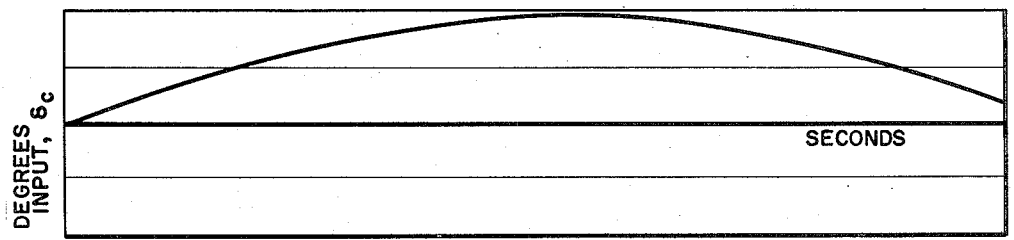
Fig. 2A is a chart of a typical input function for the servo illustrated in Fig. 2.
Figure 2B:
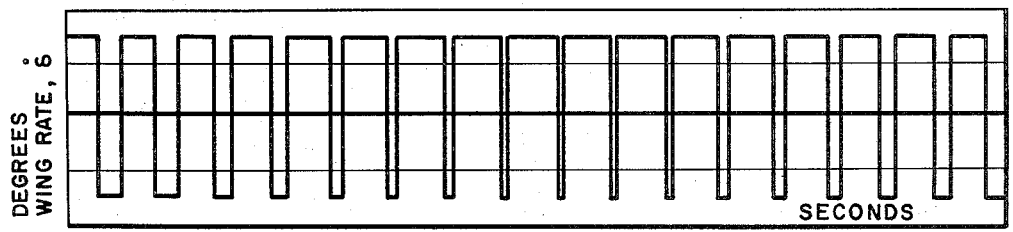
Fig. 2B is a chart of the rate function of the servo of Fig. 2 resulting from the input shown in Fig. 2A.
Figure 2C:
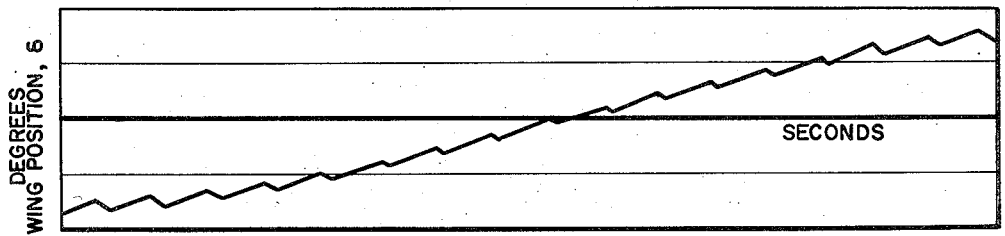
Fig. 2C is a chart of the output of the servo of Fig. 2 resulting from the input function of Fig. 2A.

In Fig. 2 there is represented, in block form, a rate switching servo whose corresponding waveforms are shown in Figs. 2A, 2B, and 2C. It will be observed that by the addition of an integrating element $$\frac{1}{s}$$

in the forward loop of the "bang-bang" servo, described with respect to Fig. 1, the excursions of the output member (Fig. 2C) are considerably reduced. Thus, rather than to depend upon a smoothing action by the load, filtering is provided as an element of the mechanism itself. The rate switching servo is thereby adapted to applications requiring finer control than is available from the "bang-bang" type mechanism. The integrating element is indicated in Fig. 2 by $$\frac{1}{s}$$

which is the conventional symbol for the Laplace operator for integration.

In many applications the small ripple present in the output position would be tolerable, but where only limited amounts of hydraulic power are available, the rate switching system is totally unacceptable. That this is true can be seen from the fact that the wing rate is always at the maximum level and the hydraulic power consumed is directly proportional to the absolute value of the wing rate.

Figure 3:
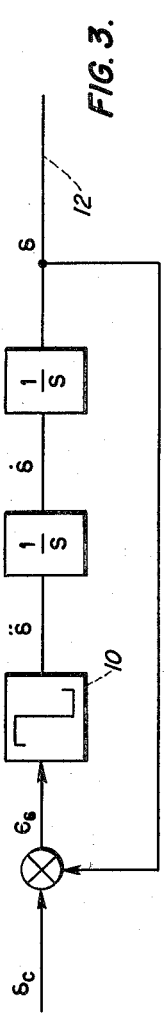
Fig. 3 is a block diagram of the pulse proportioning dual integrating servomechanism of the present invention.
Figure 3A:
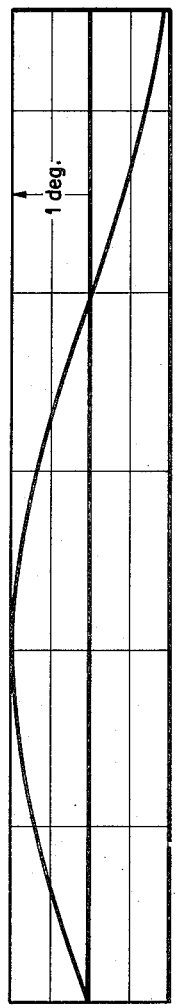
Fig. 3A is a chart of the difference or error between the input signal and the tfeedback signal for a typical input to the servo shown in Fig. 3.
Figure 3B:
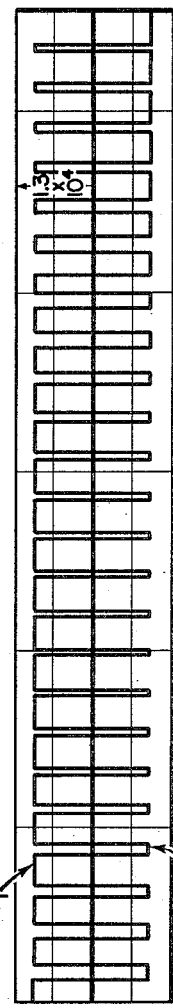
Fig. 3B is a chart of the acceleration square-wave, or torque motor position, of the servo of Fig. 3 for the error shown in Fig. 3A.

In Fig. 3 there appears a block diagram of the pulse proportioning dual integrating servo of the present invention. The pulse proportioning dual integrating servo includes still another integrating element $$\frac{1}{s}$$

in the forward loop of the rate switching servo illustrated in Fig. 2. The waveforms of the acceleration switching servo appear in Figs. 3A, 3B, 3C, and 3D.

Figure 3C:
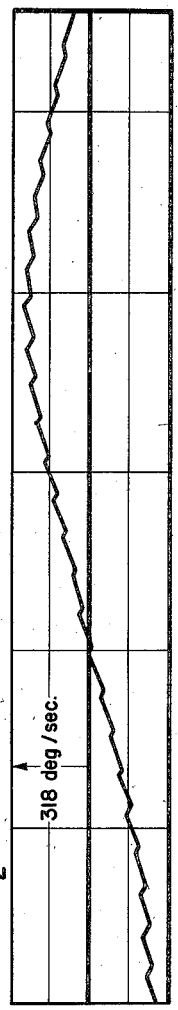
Fig. 3C is a chart of the rate function, or spool position, which results from an integration of the function of Fig. 3B.
Figure 3D:
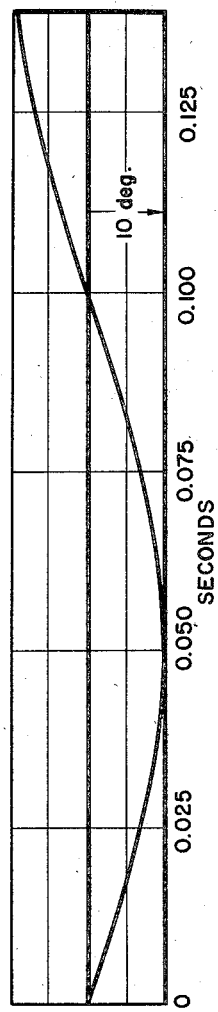
Fig. 3D is a chart of the output member position of the servo of Fig. 3 which results from integrating the function shown in Fig. 3C.

It will be observed in Fig. 3D that ripple is no longer visible in the output member position, and further, that the hydraulic power requirements, as represented by the spool position curve of Fig. 3C are consonant with permissible power consumptions for limited power systems. The square waveform, generally characteristic of switching devices, appears as the torque motor position, Fig. 3B. The power necessary to operate the torque motor is supplied as the output of an electron tube and is not in excess of a few watts. As will be observed from a comparison of the wing error and wing position curves, the result of the double integration performed in the system is a phase shift of 180°. Without more elements than are shown in Fig. 3, the system is inherently unstable. However, such a defect is readily cured by the insertion of a suitable lead network in the loop.

Fig. 4 illustrates schematically a practical form of the mechanism shown in Fig. 3. The equivalent of switch 10 of Fig. 3 is found in Fig. 4 as the combination of a mixer-unbalancer 14 and a multivibrator 16, which electrically generate the square wave switching action, and a flapper element of a control valve 37, which modulates the flow of hydraulic pressure fluid precisely in accordance with the electrical square wave. Control valve 37 also contains the first integrating element $$\frac{1}{s}$$

of Fig. 3, while the second integrating element of Fig. 3 is comprised by a hydraulic actuator 40. The construction of control valve 37 is considered in greater detail hereinafter. The free running period of the multivibrator is largely a function of the time constant of the RC grid networks comprising resistors 17 and 18, and capacitors 19 and 20. In the usual case, the grid resistors 17 and 18 are returned to a common bias supply, and thus, assuming the time constants of the networks to be equal, a symmetrical waveform is generated. However, in the present case, resistors 17 and 18 are returned to the plates 21 and 22 of triodes 23 and 24 which form the active elements of the mixer-unbalancer 14. It is recognized that the period of oscillation of a multivibrator may be controlled by varying the value of the bias voltage supplied thereto. For example, increasing the bias voltage results in more rapid switching. That is, the period of oscillation is decreased. Conversely, decreasing the bias voltage lengthens the period of oscillation.

The principle of a variable bias supply is applied to the present multivibrator to provide an asymmetric switching waveform. An input signal, which represents the desired position response of the servomechanism, is applied to the grid 25 of triode 23. The feedback voltage, representing the present position of the output member, is applied to the grid 26 of triode 24. The cathodes 27 and 28 of triodes 23 and 24, respectively, are returned through a common cathode resistor 29 to the negative terminal B— of the power supply (not shown). The cathode resistor 29 commonly biases each of the grids 25 and 26. The result can be shown to be that the voltage difference of plates 21 and 22 is proportional to the difference between the feedback voltage and the input voltage. It follows that the multivibrator output will provide an asymmetric waveform in accordance with the servo error, the error being the difference between the input signal and the feedback signal.

As an illustration, suppose that the input is more positive than the feedback signal. Plate 22 will then provide an output voltage which is more positive than that provided by plate 21. Accordingly, triode 31 will remain cut-off for a longer time than triode 32, triodes 31 and 32 being the active elements of the multivibrator 16. On the other hand, when the feedback voltage exceeds the input voltage, the voltage at plate 21 will be more positive than the voltage at plate 22, and therefore triode 32 will remain cut-off longer than triode 31. Thus, an asymmetric waveform having an error-controlled dwell time is generated by the multivibrator.

The plate voltages of triodes 23 and 24 are required to be equal when the input and feedback voltages are equal, thereby providing asymmetrical multivibrator output. The necessary equality therein is conveniently obtained by providing an adjustable resistor 33 forming part of the load for each of the triodes 23 and 24.

The output of multivibrator 16 is directly coupled to a driver stage 34 for power amplification. The driver 34 is conventional and operates in a push-pull manner to supply current to the torque-motor coils 35 and 36 of the hydraulic control valve 37.

The actuator 40 receives pressure fluid in amounts controlled by the valve 37 and drives an output member 41, which may be the wing of an aircraft. A potentiometer 42, connected to a suitable source of reference voltage, is arranged to provide a feedback voltage proportional to the position of the output member. Resistors 43 and 44 provide a convenient means of adjusting the voltage of the reference source to an appropriate scale. The feedback voltage is altered in phase by a suitable network 45 before application to the mixer-unbalancer grid.

Experiment has verified that for input signals having frequencies substantially below the switching frequency, i. e., the free-running frequency of multivibrator 16, the servo can be analyzed in the same manner as a linear mechanism. The forward loop gain is taken to be the average value of acceleration obtained per unit error voltage. The average value of acceleration is, referring to Fig. 3B, the duration $T_1$ of the positive half of a switching cycle less the duration $T_2$ of the negative half of a switching cycle, divided by the period and multiplied by the acceleration limit. Expressed mathematically, $$K, \text{ gain} = \frac{T_1 - T_2}{T_1 + T_2} \ddot{\delta}_{(max)} \quad (1)$$

The asymmetry in the multivibrator output is controlled linearly over an execptionally wide range of error signal inputs, and therefore the gain may be taken as constant.

Hence, the forward, or open loop transfer characteristic is simply $$\frac{\delta}{\epsilon\delta} = \frac{K}{s^2} \quad (2)$$

A device possessing such a transfer characteristic is obviously unstable when operated as a pure position servo, but the technique for correcting the instability is well known.

The feedback network 45 has as its transfer characteristic $$\frac{1}{\alpha}\left(\frac{\alpha\tau s+1}{\tau s+1}\right)$$

wherein $$\alpha = \frac{R_1 + R_2}{R_2}$$

and $$\tau = \frac{R_1 R_2 C}{R_1 + R_2}$$

and when such a network is included within the servo loop, there results a closed loop transfer characteristic of $$\frac{\delta}{\delta c} = \frac{\alpha(\tau s+1)}{\frac{\tau\alpha}{K}s^3 + \frac{\alpha}{K}s^2 + \alpha\tau s + 1} \quad (3)$$

which, grossly, is stable for values of $\alpha$ greater than 1.

The precise value of the components of network 45 will, of course, depend upon the gain and phase margins desired in any particular application.

The hydraulic control valve 37 is shown in greater detail in Fig. 5. A block 51 is chambered to receive a spool 52. The spool 52, as is conventional, is provided with lands 53, 53', and 53" whereby the sliding movement of spool 52 causes the admission of pressure fluid $P_s$, conveyed from a source (not shown) by conduit 54 into one or the other of the load conduits 55, 56, according to whether the spool is moved to the right or left. Simultaneously with the admission of pressure fluid into one of the load conduits, say conduit 55, the other conduit 56 is connected to the drain, or low pressure return line. Thus the actuator piston 57 (Fig. 4) experiences an imbalance of hydraulic forces which results in the movement of the piston to the right.

The sliding action of spool 52 is controlled by the following means. A groove 58 connects the pressure conduit 54 with an internal channel 59 which terminates in filter chambers 61 and 62. Filter elements 63, of porous metal, may be provided to remove particles of dirt from the hydraulic fluid. Flow limiting orifices 64 are interposed in each of the chambers 61 and 62 to control the outflow of fluid therefrom which occurs by way of channels 65 and 65'. The orifices 64 maintain the flow in channels 65 and 65' substantially constant despite pressure fluctuations in channels 65 and 65'. Channels 65 and 65' each terminate in integrating chambers 66, 66' disposed at opposite ends of the spool 52. Nozzles 67 and 67' vent channels 65 and 65' to a drain port 68.

The nozzles 67 and 67' face oppositely and are separated by a flapper 69. The flapper 69 preferably possesses only a small mass and moves in response to the direction of current flow in the torque motor coils 35 and 36. The flapper caps off either nozzle 67 or nozzle 67' in synchronism with the square-wave output of multivibrator 16 and modulates the flow into integrating chambers 66 and 66'. Thus, if flapper 69 is in left hand position, capping off nozzle 67, the flow in channel 65 accumulates in integrating chamber 66, while the flow in channel 65' is vented through nozzle 67' to drain port 68. Spool 52 is thereby displaced toward the right at a rate proportional to the flow in channel 65. The position of the spool 52 is proportional to the time integral of the flow into the integrating chambers 66 or 66'. The spool position, by varying the area of the orifice at the edges of land 53, controls the flow into the actuator.

The position of the actuator piston is the time integral of the flow through conduit 55 or conduit 56, whichever is connected to the pressure fluid source. An error in the output member is therefore doubly integrated prior to its appearance as a correction in the position of the output member.

In Fig. 6, a response curve is shown for an experimental embodiment of the present invention, wherein the acceleration limit is $10^4$ degrees/sec.$^2$ and the rate limit is 210 degrees/sec. It will be observed that for all input signals below the acceleration and rate limits of the device, very nearly linear response is obtained. For an input amplitude of 5.5 degrees, the rate limits are reached at a frequency of approximately 37 radians per second, hence the 5.5° curve commences to depart from linearity at that point. Likewise, the 12.7 degrees amplitude curve departs from linearity at 16 radians per second due to rate limiting. Below the rate limit, however, the response is very nearly flat even for such a small input as .055 degree amplitude. Moreover, the dispersion evident in the low amplitude curves strongly suggests that the elimination of experimental errors would result in a response curve which would demonstrate the nondependence of the response upon input signal amplitude so long as the acceleration or rate limit is not exceeded.

The switching activity present in the output member is negligible in the above-mentioned experimental model. The switching signal possesses a fundamental Fourier component equal to $$\frac{4}{\pi}$$

$(10^4)$ degrees/sec.$^2$ Since the switching frequency is 200 cps., the amplitude of the fundamental component observed in the output member is $$\frac{4/\pi \times 10^4}{(400\pi)^2}$$

or .008 degree. The output waveform is therefore virtually free from switching disturbance, and hence conforms very closely to the input function.

In responding to step function signals, the mixer-unbalancer assumes a potential below the cutoff value of the multivibrator, hence the switching action ceases and response is obtained at the rate limit of the device.

Simplifications in the construction of the control valve are enabled by altering its mode of operation from that of a linear proportioning device to that of a simple switch. Further, since the spool is continuously subject to oscillatory motion at the switching frequency, defects of the valve are rendered totally unobvious. That is, such former limitations as were due to spool friction, time delays due to spool mass, hysteresis, etc., are removed. In addition, more than adequate forces are available to shift the spool position (of the order of 50 lbs. in the above-mentioned model). Thus, such impeding factors as dirt or gum are no longer effective to alter the characteristics of the servo.

Obviously many modifications and variations of the present invention are possible in the light of the above teachings. It is therefore to be understood that within the scope of the appended claims the invention may be practiced otherwise than as specifically described.

What is claimed is:

1. An acceleration switching servomechanism comprising, a movable output member, means receiving an input signal representing the required displacement from neutral position of said output member, feedback means providing a signal representing the actual displacement from neutral position of said output member, means for obtaining the difference voltage between said input signal and said feedback signal, a square-wave generator controlled by said difference voltage to provide a square-wave output having an average value proportional to said difference voltage, first time integrating means receiving said square-wave output and providing an output proportional to the velocity of said output member, second time integrating means receiving said velocity output of said first time integrating means and providing an output proportional to the displacement from neutral position of said output member, and means connected to said feedback means for stabilizing the operation of said servomechanism.

2. An acceleration switching servomechanism comprising, input means, feedback means, means controllable by said input means and said feedback means for generating a square-wave output, a source of pressure fluid, a control valve including a spool freely movable therewithin for controlling the flow of pressure fluid from said source, an actuator receiving the major portion of the flow of pressure fluid from said source and altering its position in accordance with the time integral of said flow, means within said valve providing a constant flow of pressure fluid, an integrating chamber at each end of said spool, a pressure fluid passage to each of said chambers for admitting said constant flow thereto, a drain passage to each of said chambers for exhausting fluid therefrom, means for obstructing each of said drain passages in synchronism with said square-wave to cause alternate accumulation and exhaustion of fluid in each of said chambers, the accumulation of fluid in a chamber altering the position of said spool in accordance with the time integral of flow into said chamber, and means for stabilizing the operation of said servomechanism.

3. An acceleration switching servomechanism comprising, a movable output member, means receiving an electrical input signal and an electrical feedback signal to provide a voltage proportional to the difference between said signals, an electrical square-wave generator providing an asymmetric square-wave output, the asymmetry therein being controllable by said difference voltage, a magnetic coil receiving said square-wave and providing a magnetic force proportional to said square-wave, a source of pressure fluid, an actuator for moving said output member in response to the admission of pressure fluid to said actuator, a control valve for controlling the flow of pressure fluid to said actuator, said valve including a spool, integrating chambers at each end of said spool, fluid passages for admitting pressure fluid to said integrating chambers, and a flapper having a low mass and being movable by said magnetic force for modulating the flow within said fluid passages in accordance with said square-wave, and means for stabilizing the operation of said servomechanism.

4. A servomechanism as claimed in claim 3 wherein said stabilizing means comprises a lead network for advancing the phase of said feedback signal.

5. A servomechanism comprising, a multivibrator for generating an asymmetrical square-wave output, an amplifier for controlling the asymmetry in said square-wave, means providing a first hydraulic flow proportional to said square-wave, first integrating means for providing the time integral of said first hydraulic flow, means controllable by said first integrating means for proportioning a second hydraulic flow, second integrating means for providing the time integral of said second hydraulic flow means controllable by said second integrating means for providing a feedback signal proportional to the output of said second integrating means, and means receiving said feedback signal and connected to said amplifier for altering the phase of said feedback signal.

6. An acceleration switching servomechanism comprising, a multivibrator for generating an asymmetric switching signal, a mixer-unbalancer for controlling the asymmetry in said switching signal, an input connection to said mixer-unbalancer, a feedback connection to said mixer-unbalancer, said mixer-unbalancer being controlled by the voltages at said input and feedback connections, means for amplifying said switching signal, a torque motor receiving said amplified switching signal and providing a magnetic switching force output, a valve chamber, a movable spool in said valve chamber, a first integrating chamber at one end of said spool, a second integrating chamber at the opposite end of said spool, the volume of said integrating chambers varying in inverse relationship upon axial movement of said spool, a first hydraulic stream, a flapper movable by said magnetic switching force for directing said first stream into said first integrating chamber and into said second integrating chamber in alternation, said spool thereby moving in accordance with the difference between the time integral of the flow into each of said integrating chambers, a second hydraulic stream having a flow controllable by said spool, an integrating actuator receiving said second stream and providing an output proportional to the time integral of the flow of said second stream, a feedback potentiometer connected to said actuator, means for energizing said potentiometer to provide an output voltage proportional to the output of said actuator, and a feedback network connected to said potentiometer and to said feedback connection of said mixer-unbalancer for altering the phase of said potentiometer output voltage thereby stabilizing the operation of said servomechanism.

7. A hydraulic servomechanism controllable by an electrical input signal, comprising, a source of pressure fluid, a reversible fluid actuator having a first conduit for pressure fluid and a second conduit for pressure fluid, a control channel interposed between said pressure fluid source and said first and second conduits, a drain port in said channel, a spool having a plurality of lands thereon and slidably seated in said channel for simultaneously admitting pressure fluid in said channel to one of said conduits and connecting the other of said conduits to said drain port thereby causing displacement of said actuator, feedback means connected to said actuator for providing an electrical signal proportional to the displacement of said actuator, means for shifting the phase of the output of said feedback means, electrical means receiving an input control signal and the output of said phase shifting means for providing an asymmetrical alternating signal, the asymmetry in said signal being related to the difference between the input control signal and the output of said phase shifting means, a first integrating chamber at one end of said spool, a second integrating chamber at the opposite end of said spool, and means receiving said alternating signal and connected to said pressure fluid source for admitting pressure fluid from said source to each of said integrating chambers in alternation according to said alternating signal.

References Cited in the file of this patent

UNITED STATES PATENTS

| | | |
|---|---|---|
| 2,506,531 | Wild | May 2, 1950 |
| 2,582,088 | Walthers | Jan. 8, 1952 |
| 2,655,940 | Jackson | Oct. 20, 1953 |
| 2,669,312 | Dinsmore | Feb. 16, 1954 |
| 2,697,417 | Mayer | Dec. 21, 1954 |
| 2,738,772 | Richter | Mar. 20, 1956 |
| 2,767,689 | Moog | Oct. 23, 1956 |